April 23, 1968  A. T. FORRESTER ET AL  3,379,855
FLUID FEED SYSTEM

Filed May 13, 1963  2 Sheets-Sheet 1

INVENTORS
ALVIN T. FORRESTER
FRANK A. BARCATTA
BY Allen E. Botney
ATTORNEY

April 23, 1968    A. T. FORRESTER ET AL    3,379,855
FLUID FEED SYSTEM
Filed May 13, 1963    2 Sheets-Sheet 2

INVENTORS
ALVIN T. FORRESTER
FRANK A. BARCATTA
BY Allen E. Botney
ATTORNEY

United States Patent Office 3,379,855
Patented Apr. 23, 1968

3,379,855
FLUID FEED SYSTEM
Alvin T. Forrester, Los Angeles, and Frank A. Barcatta, Pasadena, Calif., assignors to Electro-Optical Systems, Inc., Pasadena, Calif., a corporation of California
Filed May 13, 1963, Ser. No. 279,750
4 Claims. (Cl. 219—274)

The present invention relates in general to fluid supply or feed systems and more particularly relates to a propellant feed system for ion engines.

The function of a feed system in an ion engine is perhaps the simplest of all the ion engine elements. Basically, it is to supply propellant to the engine on demand and at a controlled rate. This function is completely satisfied by providing propellant storage and controlled propellant vaporization. At first glance, this task would appear to be quite simple. However, a more thorough analysis would indicate the many serious problems that must be solved in order to develop a working feed system.

By way of example, in addition to its primary function, namely, that of delivering propellant vapor to the engine, a versatile feed system should respond rapidly. Rapid response, which is an essential feature of a feed system delivering propellant to an ion engine used for attitude control, is also a desirable attribute of any good system independent of the application, since it greatly simplifies the engine control system and makes it possible to rapidly correct undesirable trends in engine performance.

In addition, the propellant feed system should be capable of providing controlled flows over a wide range. The ability to do this allows the feed system to fuel a large variety of engines and also provides flexibility in the operation of any one particular engine, thereby permitting thrust variation over a wide range. Present ion engines require propellant flow rates ranging from $10^{-4}$ to $10^{-1}$ grams per second. These flow rates are exceedingly low for conventional flow regulating and controlling equipment. Since flow rates are not expected to increase in the near future by more than an order of magnitude, unconventional means of propellant delivery must therefore be provided.

Moreover, operation in a near zero $g$ environment imposes problems associated with maintaining stable liquid-vapor interfaces within the propellant system. An interface normally exists in the vaporizing area. Stability here is extremely important since disturbances of this interface can cause fluctuations in the flow rate and, therefore, corresponding fluctuations in the engine performance.

Consequently, with the improving performance displayed by ion engines, a need has arisen for a reliable propellant feed system which can deliver controlled propellant flow for extended periods of time.

The present invention provides a feed system that overcomes the problems mentioned and this is done by relying entirely on surface tension forces to maintain stable liquid-vapor interfaces and to provide the force necessary for transport of the propellant. More specifically, a liquid that wets the walls of a container moves into a position for which its free surface area is minimum and contacting area maximum. It has been discovered that by using tapered capillary tubes, the liquid, under the action of these surface tension forces, moves toward the narrow end. This is the essence of the present invention and provides a feed system which is inherently much more simple and reliable than earlier systems and one in which simple temperature control of the vaporizing area is sufficient to provide a wide range of controlled flow rates. Furthermore, feed systems constructed in accordance with the present invention have no moving parts, with the result that they are of long life and extremely reliable. In one embodiment, the tapered capillary tubes are mounted in a vessel which contains the propellant fluid, the narrow ends of the tubes being disposed in the exit port of the vessel. Contiguous to the surface formed by the narrow ends of the capillary tubes is a heater element which preferably takes the form of a heater coil. In a modification of the above said embodiment, a metal sponge of graded porosity is substituted for the capillary tubes.

It is, therefore, an object of the present invention to provide a propellant feed system for ion engines that will have stable liquid-vapor interfaces within the system.

It is another object of the present invention to provide a propellant feed system for ion engines by means of which controlled flows of propellant over a wide range can be obtained.

It is a further object of the present invention to provide a propellant feed system for ion engines that can respond rapidly to the needs of the engine.

It is an additional object of the present invention to provide a propellant feed system for ion engines that will last a long time, require very little maintenance, and be extremely reliable.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1A:
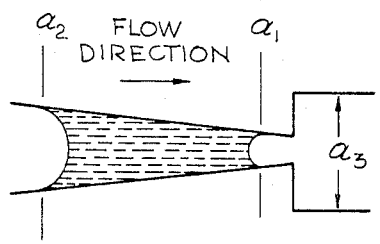
FIGURES 1a and 1b illustrate an elementary form of tapered channel feed system.
Figure 1B:
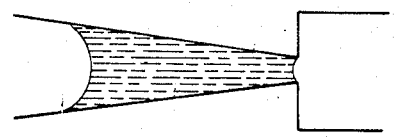
Figure 3:
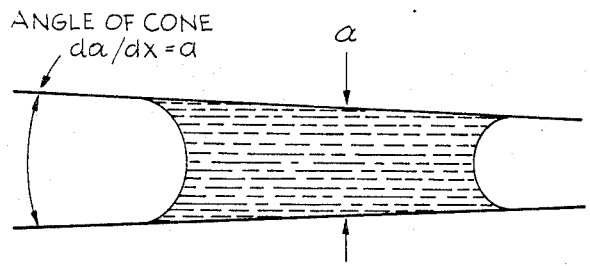
FIGURE 3 shows the formation of a drop of a wetting liquid in a tapered capillary tube.
Figure 2:
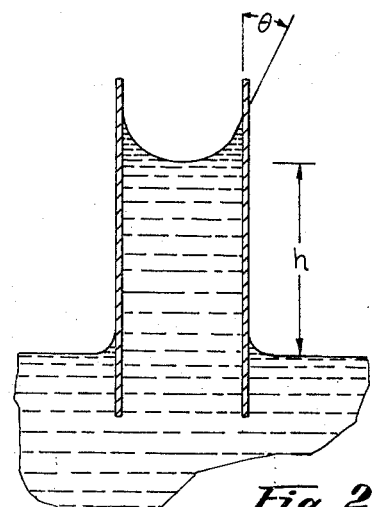
FIGURE 2 illustrates the rise of a wetting liquid in a capillary tube.

Considering now the drawings, reference is made in particular to FIGS. 1–3 wherein the fundamental aspects of the invention are illustrated. Thus, in its simplest form the system consists of a hollow tube whose diameter decreases in the direction of flow. It will be shown below that in the situation shown in FIG. 1a, there is a force on the liquid in the direction indicated. This force will move the liquid to the right until the configuration shown in FIG. 1b is achieved. In the latter case, the shape of the meniscus at the small end of the tube is changed until the net force on the column is zero. Delivery of vapor can be achieved by heating the small end of the tube while surface tension forces deliver liquid as vapor is evaporated.

To describe the properties of this feed system it is advantageous to utilize the surface energy concept. Energy is required to form a free liquid surface and the energy per unit area of this surface is the usual surface tension $\sigma_0$. This is always a positive quantity. There is also an energy per unit area associated with exposing a free solid surface and another with the liquid solid interface. However, in using energy, one is concerned only with variations as the configuration changes rather than with the absolute magnitude of the energy. Since the decrease in free solid surface is equal to the increase in liquid-solid interface, it is adequate to use an energy per unit area which is the difference between these two surface energy terms, either an energy proportional to the free solid surface or an energy proportional to the contacting surface. These two terms will have the same magnitude but be of opposite sign. For sake of convenience, it is preferred to use a term $\sigma_1$ proportional to the contact area between the liquid and tube.

A relationship between the surface energies $\sigma_1$ and $\sigma_0$ is easily established in terms of the contact angle $\theta$. FIGURE 2 shows the rise of a wetting liquid in a capillary tube. The height is given by the equation $$h = \frac{2\sigma_0}{\rho g r} \cos \theta \quad (1)$$

$\rho$ is the liquid density, $g$ is the acceleration of gravity, and $r$ is the radius of the tube.

The energy equation is $$u = \sigma_1 2\pi r h + \frac{\pi r^2 h^2 \rho g}{2} \quad (2)$$

where the first term is the energy associated with the interface and the second is the gravitational energy term. The free surface term is not included since it does vary with $h$. The height of the column is found by setting $dU/dh = 0$ to obtain $$h = \frac{2\sigma_1}{\rho g r} \quad (3)$$

A comparison between the two expressions for $h$ gives immediately $$\sigma_1 = \sigma_0 \cos \theta \quad (4)$$

In the wetting case ($0 < \theta < \pi/2$), $\sigma_1$ is always negative. For the non-wetting case ($\pi/2 < \theta < \pi$), $\sigma_1$ is positive.

The remainder of this work could be done generally but for sake of brevity, attention is directed to the situation of a liquid-solid combination in which $\cos \theta \approx 1$, i.e., $\theta \lesssim 20°$. This is a good approximation for cesium, the propellant used for most ion engines, and most compatible solids. In this case $\sigma_1$ reduces to $-\sigma_0$ and our notation is simplified by the use of a single term $\sigma = \sigma_0 = -\sigma_1$.

Consider now a drop of liquid in a conical tube as shown in FIG. 3. Let it be supposed that the drop is small enough, or the taper gentle enough, that the radius varies very little over the length of the liquid column. Let $\tau$ = volume of the drop.

The length of the drop $4\tau/\pi a^2$ where $a$ is the diameter of the tube. If the ends of the liquid column are taken to be hemispheres, the energy can be written as $$U = \pi a^2 \sigma - \pi a \frac{4\tau \sigma}{\pi a^2}$$

$$= \sigma \left( \pi a^2 - \frac{4\tau}{a} \right) \quad (5)$$

The force on the liquid column is $$F = -\frac{dU}{dx} = -\sigma \left( 2\pi a + \frac{4\tau}{2} \right) \frac{da}{dx} \quad (6)$$

showing a force oppositely directed to $da/dx$, i.e., always in the direction of convergence, as stated earlier. If $\tau \gg a^3$ (long droplets) the first term in parentheses can be neglected, obtaining $$F = \frac{4\sigma \tau \alpha}{a^2} \quad (7)$$

where $\alpha = da/dx$ is the angle of the cone. Since $4\tau/\pi a^2 = l$ (the column length) and $\alpha l = (\Delta a)$, Equation 7 becomes $$F = \pi \sigma (\Delta a) \quad (8)$$

It is useful to put this force in terms of the weight of the liquid, especially if one is interested in a system to operate both in space and in the laboratory. Thus, introducing a proportionality constant $\gamma = F/mg = F/\tau \rho g$, where the quantity $\gamma$ is the force in $g$'s on the liquid, by substitution in Equation 7 there is obtained $$\gamma = \frac{4\sigma \alpha}{a^2 \rho g} \quad (9)$$

This discussion started out with the assumption that the drops were small enough so that the radius did not vary much over the drop. It was then found that if the drops were long enough, the first term in Equation 6 could be neglected, the term which arose from the free surface energy. If both of these assumptions can be realized, then we immediately have the solution for a long column which is the same as a series of short columns except for the lack of the free surfaces separating the columns.

The two assumptions made are indeed realizable, requiring only that $$\frac{da}{dx} = \alpha \ll 1 \quad (10)$$

It would be very unlikely that angles would be desired that do not satisfy the inequality of Equation 10 since they correspond to a diameter that varies too rapidly. Equation 8, then, is valid for liquid columns even if the radius shows large variations, providing only that 9 is satisfied everywhere. For Equation 9 to have meaning for a long tube of liquid it is only necessary that the tube geometry be such that $\alpha/a^2$ be constant along the length of the tube. It is thus seen that Equation 9 makes it possible to design a tube for any desired $\gamma$. For a feed system which is to be used in the laboratory in various orientations, the tube size required is very small. On the other hand, for systems to be used exclusively in space, very large bore, shallow tapered tubing can readily be used.

In addition to information on the force which is available to keep the liquid moving toward the surface from which vaporization is occurring, it is necessary to consider the velocity of this flow, as limited by viscosity, in order to determine whether propellant can be delivered fast enough. This is readily accomplished for flow in tubes. For example, for droplets whose length is large compared to the tube diameter $a$, the velocity of flow toward the narrow end of the tube can be shown to be $$v = \frac{\sigma}{8\eta} \frac{da}{dx} \quad (11)$$

where $\eta$ is the coefficient of viscosity, approximately $5 \times 10^{-3}$ poise for liquid cesium. This can also be written as $$v = \frac{\gamma \rho g}{32 \eta} a^2 \quad (12)$$

Aside from droplets, however, the velocity of the liquid at the small diameter end of a long column of liquid is much greater since the relatively large mass of liquid which resides in the large diameter portion of the tube, where viscous drag is slight, pushes on the column at the small end where velocities get very much greater. Indeed, if $a_2 \gg a_1$ then the velocity of the liquid at the small end can be shown to be $$v = \frac{1}{8} \frac{\sigma}{\eta} \frac{a^2_2}{a_1^2} \frac{da}{dx} \quad (13)$$

This may change the velocity of liquid approaching the small end by a factor of 100. All of these velocities are very large compared to those liquid flow velocities required for even very high thrust engines.

The actual flow velocities needed may be judged by taking an example. Accordingly, assume a tube which has an area of 0.05 cm.² feeding a 100 ma. engine. The area .05 cm.² is not large. Even if finer tapered tubes were used, they would be in the form of a bundle which would probably have that total cross section. The assumed area and current readily lead to a required velocity of $1.5 \times 10^{-3}$ cm./sec. in the liquid. This is so small compared to obtainable velocities that there does not appear to be any difficulty in maintaining the liquid vapor interface at the narrow end of the tube.

Figure 4:
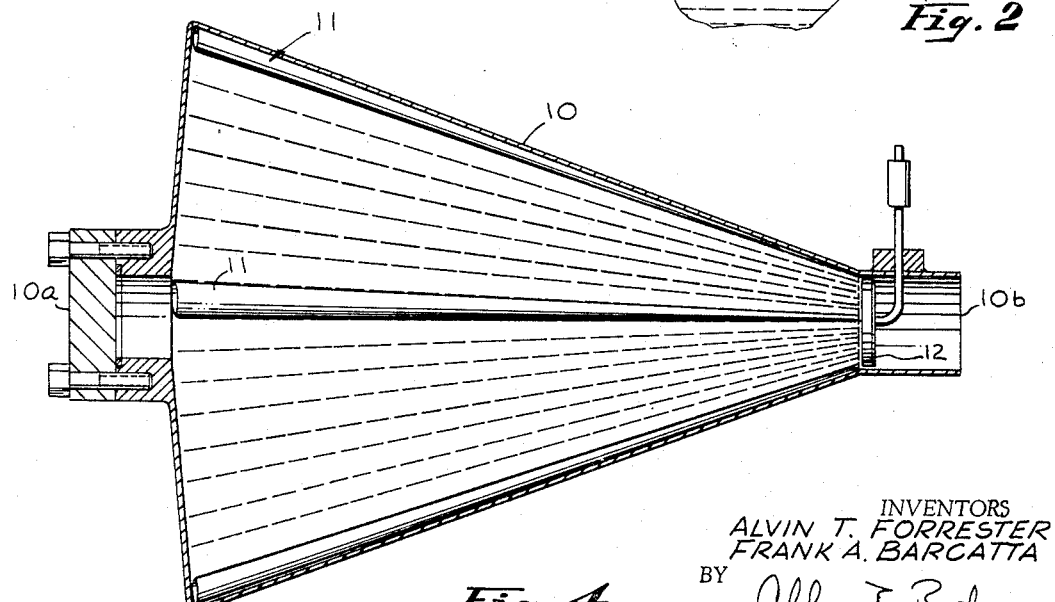
FIGURE 4 illustrates an embodiment of the present invention using tapered capillary tubes.

The underlying principles of the invention having been presented, reference is now made to FIG. 4 wherein an embodiment of the invention is shown to include a vessel or container 10 in which are mounted a relatively large number of tapered capillary tubes 11 formed or arranged in a bundle. The tubes are oriented so that all their narrow ends are together at one end of the bundle, the larger tube endings therefore also being together at the other end of the bundle. As is shown in the figure, vessel 10 includes a fill cap 10a that can be opened to admit propellant and an exit port 10b through which the propellant in vaporized form emerges. In order to vaporize the propellant a heater coil 12 is mounted in exit port 10b contiguous to the face of the bundle. More specifically, the plane of the coil is face-to-face with the surface of the tubes. The ends of the coil are connected to a source of electrical current (not shown). In its operation, propellant fluid, such as cesium, is admitted in sufficient quantity to vessel 10 through cap 10a. The propellant enters capillary tubes 11 and because of the surface tension forces the propellant in the tubes is driven forward toward the narrower end of the tube bundle, as previously explained, where the propellant is vaporized by the heat from coil 12. The propellant vapor enters and passes through exit port 10b to other parts of the ion engine, the fluid propellant moving forward to fill up the vacated space. A stable, long-lasting, continuous feed system is thereby provided.

To simplify construction and to make possible much finer pore sizes, the storage and feed system of FIG. 4 may be modified by utilizing a graded porous sponge. As in the tapered tube feed, however, surface tension is entirely depended upon for the storage and feed properties of the system.

Figure 5:
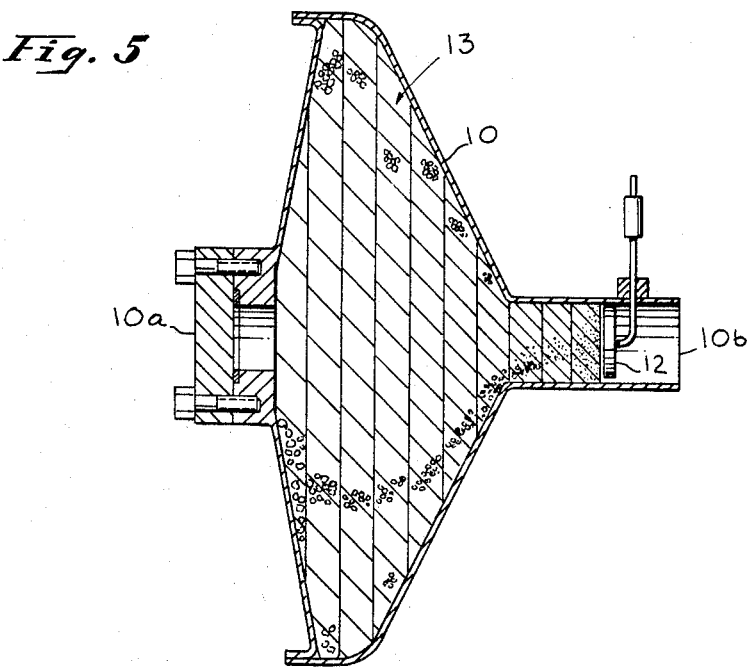
FIGURE 5 illustrates a modification in the FIG. 4 embodiment in which a sponge of graded porosity is substituted for the tapered capillary tubes.

Accordingly, reference is made to FIG. 5 wherein the modified embodiment, as before, includes a vessel or container 10 having a fill cap 10a and an exit port 10b. Instead of tapered capillary tubes, however, the FIG. 5 embodiment includes the equivalent, namely, a plurality of porous slabs or wafers 13 sandwiched together between the fill cap and the exit port. As previously mentioned, the pores are of graduated size with the wafer having the largest-sized pores being at the fill cap end of the vessel and the wafer having the finest pores being adjacent the exit port. Extremely low density, high porosity sponges in nickel, stainless steel and other materials are readily available. More specifically, materials can be obtained with pore sizes of 1000 microns with densities of 2% the density of the solid material down to pore sizes of about 10 microns with densities of about 40 percent the density of the solid material. Ten wafers 13 are shown in FIG. 5 and, by way of example, their pore sizes may be 50, 70, 100, 120, 150, 200, 250, 350, 600 and 1000 microns in going from one end to the other. Of course, instead of using wafers, sponges may be used in which the pore size varies with distance in accordance with a prescribed formula. However, the wafers are more conveniently fabricated and they work equally well. Operation is the same as it was before in connection with the tapered capillary tubes, that is, surface tension forces move the propellant fluid forward from the wafers of coarse porosity to those of fine porosity. Continuous feed is provided by vaporizing the propellant, this being achieved by heater coil 12 which is positioned contiguous to the wafer of finest porosity and in face-to-face relationship therewith.

Figure 6:
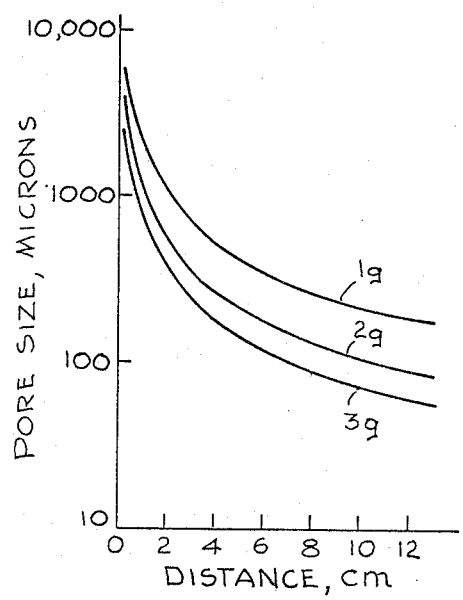
FIGURE 6 is a family of curves illustrating the gradation of pores with distance.
Figure 7:
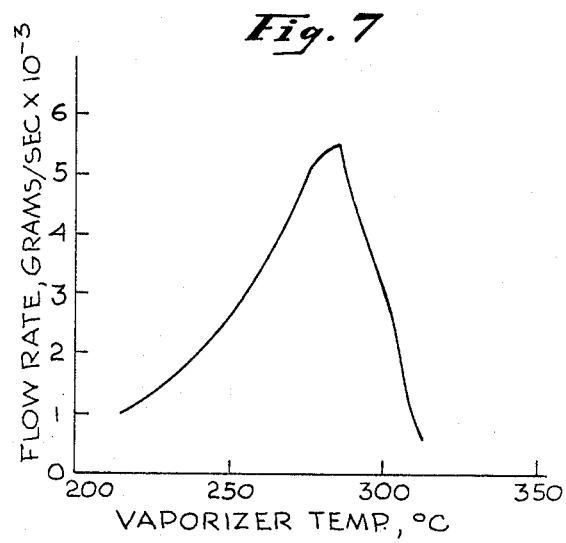
FIGURE 7 is a curve illustrating the manner in which flow rate varies with temperature.

Pore size as a function of distance along the sponges is illustrated in FIG. 6, the propellant considered for obtaining the curve being cesium. It will be recognized that the curves plotted in FIG. 6 can be extended in the abscissa direction so that sponges of different lengths and of a wide variety of pore sizes can be determined. On the other hand, the flow characteristics of a porous system are depicted in FIG. 7 wherein flow rate as a function of temperature is presented.

While a few variations have been shown and pointed out in the discussion herein, it will be understood that the invention is not so limited. Thus, by way of example, the present invention can be used to supply drinking water in a gravity-free environment, may be used as a lubricant source, etc. In general, the present invention may be used wherever it is desired to supply a fluid at a controlled rate providing, of course, the fluid is a wetting fluid. To supply drinking water, for example, the FIG. 4 embodiment would be substantially the same, only the heater coil need be removed. Accordingly, the invention should be considered to include any and all modifications, alterations or equivalent arrangements falling within the scope of the annexed claims.

Having thus described the invention, what is claimed is:

1. A propellant feed system comprising: a hollow vessel having an exit port at one end and a fill cap through which propellant may be fed at the other end thereof; a metal sponge of graduated porosity mounted in and filling said vessel between said exit port and said fill cap, said sponge being made up of a plurality of wafers having capillary-sized pores therein and therethrough of respectively different pore sizes with the wafer having the finest pore size positioned in said exit port and the wafer having the coarsest pore size positioned adjacent said fill cap; and means mounted in said exit port for sufficiently heating the face of said wafer or finest porosity to vaporize any propellant therein.

2. The feed system defined in claim 1 wherein said means includes a flat electric heater coil contiguous to and in face-to-face relationship with said wafer of finest porosity, and a variable source of electrical current connected to said coil.

3. A fluid feed system comprising: a wetting fluid source; and a member for applying surface tension forces to said fluid to move it from said source to another point, said member including a structure having capillary-sized channels of graduated cross-sectional area extending therethrough from one end to the other, the portion of said channels having the finest cross-sectional areas being at one end of the structure and the portion of said channels having the coarsest cross-sectional areas being at its other end, said structure being mounted so that its end having the coarsest cross-sectional channel areas is in contact with said wetting fluid source and its end having the finest cross-sectional channel areas is at the point to which said fluid is to be moved, whereby said fluid is moved by surface tension forces from said source and through said channels to said other point.

4. A propellant feed system for delivering a fluid propellant by exerting surface tension forces on it, said system comprising: a hollow vessel having entrance and exit ports at opposite ends thereof, said vessel being tapered with the entrance and exit ports at the widest and narrowest ends, respectively; a member having capillary-sized channels of graduated cross-sectional area extending through it from one end to the other filling said vessel with the finest channel areas being adjacent the exit port and the coarsest channel areas being adjacent the entrance port; first means for supplying a wetting propellant fluid to said entrance port; and second means mounted in said exit port for sufficiently heating the face of said member to vaporize said propellant.

References Cited
UNITED STATES PATENTS

| | | | |
|---|---|---|---|
| 1,028,535 | 6/1912 | De Brandner | 210—290 X |
| 1,769,388 | 7/1930 | Prentice | 210—185 X |
| 1,944,821 | 1/1934 | Blaise | 219—274 |
| 2,337,357 | 12/1943 | Stuewer | 239—44 |
| 2,344,202 | 3/1944 | Carlson | 239—44 |
| 2,804,291 | 8/1957 | Segerstad | 261—104 X |
| 2,551,114 | 5/1951 | Goddard | 239—145 |
| 3,258,909 | 7/1966 | Davis et al. | 60—35 |

ANTHONY BARTIS, *Primary Examiner.*